July 30, 1935.  C. N. McDAVITT  2,009,853

BRAKE MECHANISM

Filed April 24, 1934

Inventor:
Carlisle N. McDavitt,
by Harry E. Dunham
His Attorney.

Patented July 30, 1935

2,009,853

UNITED STATES PATENT OFFICE 2,009,853

BRAKE MECHANISM

Carlisle N. McDavitt, Schenectady, N. Y., assignor to General Electric Company, a corporation of New York Application April 24, 1934, Serial No. 722,085

3 Claims. (Cl. 188—171)

My invention relates to brake mechanisms of the type which employs energy storing or resilient means for applying the brake and which employs electromagnetic means for overcoming the applying means to cause the release of the brake.

In apparatus heretofore constructed a spring commonly has been used as the source of energy for applying the brake and for the purpose of changing the braking effort produced thereby, the apparatus often has been provided with some means for changing the tension of the spring. A disadvantage of such apparatus is that there is danger of increasing the spring tension to such an extent that the electromagnet is unable to overcome the spring to release the brake. Not only may the magnet thus be unable to operate the mechanism but because of its inability to do so and thus to reduce the reluctance of its magnetic circuit it may be damaged by the resulting excess of current taken thereby.

It is the object of my invention to provide an improved brake mechanism of the above mentioned type by which these disadvantages may be overcome. In accordance with my invention I have provided a brake mechanism of this type whereby as the brake applying force is changed the relation of the parts of the electromagnet also is changed in an appropriate manner to enable the magnet to meet the new condition and effect the release of the brake in an efficient manner and without danger to the winding thereof.

My invention will be better understood from the following description taken in connection with the accompanying drawing, and its scope will be pointed out in the appended claims.

Figure 1:
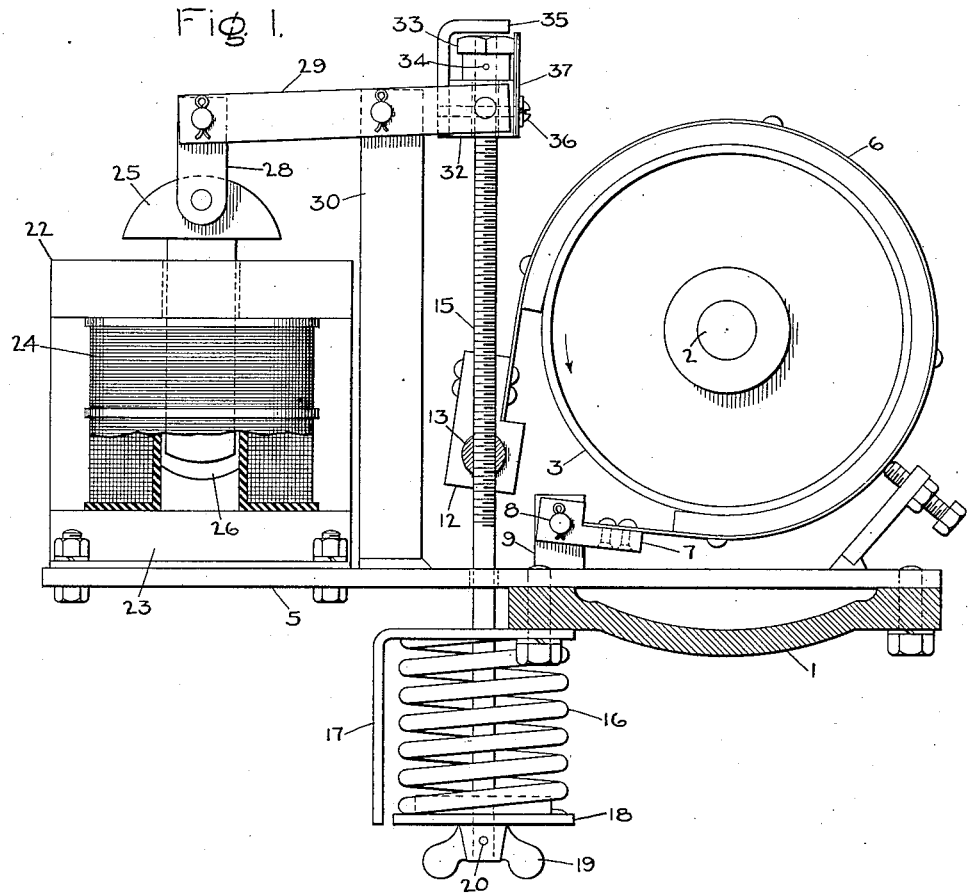
Figure 2:
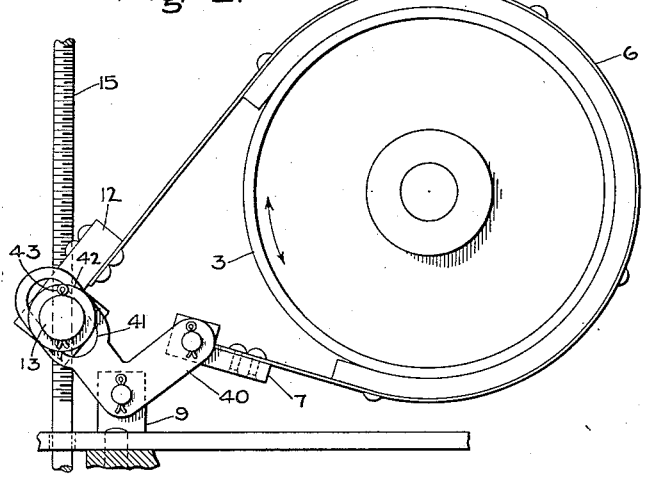

Referring to the drawing, Fig. 1 is a side elevation illustrating one embodiment of my invention, and Fig. 2 is a fragmentary view showing a modified form thereof.

In the drawing 1 represents a machine frame having bearings (not shown) for the shaft 2 to which is secured the brake drum 3 which is to receive the braking effect and which rotates in the direction of the arrow. Secured to the frame 1 is the base plate 5 which supports the brake mechanism. The brake 6 which engages the brake drum 3 is shown as of the band type having one end secured through the terminal block 7 and the pin 8 to the lug 9 on the base plate. The opposite end of the brake band is secured to the crosshead 12 through which extends the pin 13. The brake operating rod 15 is screw-threaded at its intermediate portion in the pin 13 and extends through a suitable opening in the crosshead 12. The lower end of rod 15 extends through the brake applying spring 16 which is secured at its upper end to the spring bracket 17 and at its lower end engages the spring seat 18. For convenience in turning the rod 15 to vary the tension of the spring 16 I have provided the handle 19 which is shown resembling a winged nut but which is fixed to the rod 15 by the small pin 20.

The brake is released against the force of spring 16 by the electromagnet 22 and the connection which I will now describe between it and the rod 15. The electromagnet 22 is of well known construction comprising the field structure 23, the winding 24, and the armature or plunger 25, there being an air gap 26 between the end of the plunger and the cooperating portion of the field structure. The electromagnet is preferably laminated whereby it is adapted for use on either alternating or direct current circuits and may be of the construction disclosed and claimed in the Trombetta Patent 1,696,615 December 15, 1928. The plunger 25 is connected through link 28 with the long end of lever 29 which lever is fulcrumed on the post 30 rising from the base plate 5. The opposite end of lever 29 is pivotally connected to the rectangular member 32 through which the operating rod 15 extends and may rotate freely. Engaging the upper face of the member 32 is the nut 33 which is fixed to the rod 15 by means of the small pin 34. A suitable stop bracket 35 is secured to the member 32 and is arranged to overhand the nut 33. Secured to the member 32 by the screws 36 on the side opposite to the stop bracket 35 is the spring detent 37 which by engaging the faces of the nut 33 prevent any accidental turning of the rod 15 but permit it to be readjusted by rotating the handle 19 thereon for changing the tension of the spring 16.

In the construction of the apparatus the lengths of the two arms of lever 29 are so proportioned that the electromagnet when energized is able to compress the spring 16 to effect the release of the brake. If it is desired to increase the braking effort the handle 19 is rotated in the proper direction to cause the rod 15 to screw upwardly through pin 13 thereby further compressing spring 16. Since the nut 33 at the upper end of rod 15 is fixed thereto it will be seen that this upward screwing of the rod 15 allows the lever 29 to rock counterclockwise and the plunger 25 to descend in the magnet to shorten the air gap 26. Thus as the spring tension is increased the air gap is decreased so that the force exerted by the electromagnet is simultaneously increased. Conversely if the handle 19 is turned in the reverse direction to decrease the tension of the spring 16, the rod 15 by being screwed downwardly through pin 13 raises the plunger 25 to increase the air gap. The magnet, however, is still able to operate the mechanism for although its air gap is increased the force which it must overcome, namely, the tension of spring 16, has been decreased.

The lever 29 is so constructed that the ratio of its arms is such that the pull required by the elctromagnet to release the brake is always less than the inherent pull curve of the electromagnet, and it is never possible to increase the air gap to such an extent that the winding on the electromagnet would burn out or that the load imposed on the electromagnet would exceed the magnetic pull thereof. It will also be noted that should the spring 16 be tensioned beyond the power of the electromagnet to effect the release of the brake at which tension the brake would probably be locked to the drum the air gap would have been reduced to zero or to such a small value that the inductive reactance of the electromagnet when used on an alternating current circuit will be sufficiently high to protect the winding against excessive current therein. A turning of the handle 19 in addition to changing the spring tension and changing the air gap functions also to change the clearance between the brake and the drum when the brake is released. Thus as the screw is rotated in the direction to increase the spring tension and decrease the air gap it also decreases the clearance between the brake and the drum and conversely as the screw is rotated in the opposite direction to decrease the spring tension and increase the air gap it also increases the brake clearance.

Where the brake mechanism is intended to function with the drum rotating in either direction, I have provided a modified form of the connection of the brake band with the operating rod 15 as shown in Fig. 2. In this modified form one end of the brake drum 6 connects with the operating rod 15 through the crosshead 12 just as in Fig. 1. The opposite end of the brake band, however, connects through the terminal member 7 with one arm of the bell crank 40, which is pivoted to lug 9 on the base plate. The other arm of the bell crank has a slot 41 which receives the pin 13 threaded on the operating rod 15, a suitable washer 42 and cotter pin 43 being provided to retain the bell crank in position on the pin.

Downward movement of the rod 15 produced by spring 16 in applying the brake in this form of my invention rocks the bell crank 40 in a counterclockwise direction thereby tensioning the lower connection of the brake 6 at the same time that the upper connection thereof is tensioned. Since both the upper and lower connections of the brake are tensioned simultaneously by the same operating mechanism this form of my invention is well adapted for use where the brake drum may rotate in either direction.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States, is:

1. Brake mechanism comprising a brake, a brake applying spring, a rod connecting said brake and spring and having a screw connection with the brake, an electromagnet having an armature connected with said rod for stressing the spring to release the brake and means for turning the rod to shift it longitudinally thereby simultaneously changing the tension of the spring and changing the position of the armature.

2. Brake mechanism comprising a brake, a brake applying spring, a rod connecting said brake and spring and having a screw connection with the brake, an electromagnet having a field structure and a cooperating plunger, a lever connected at one end with said plunger, a pivotal connection between the lever and the rod and a member secured to said rod by which it may be turned.

3. Brake mechanism comprising a band brake, a brake applying spring, a threaded rod connected with one end of said spring, a member threaded on said rod and secured to one end of said brake, an electromagnet having a field structure and a cooperating plunger spaced therefrom by an air gap, a lever connected at one end with said plunger, a member provided with a spring detent pivotally connected with the other end of said lever, a nut fixed on said rod engaging said pivotally connected member and arranged to be engaged by said detent and a handle on said rod for turning the same to change the tension of the spring and simultaneously to change said air gap.

CARLISLE N. McDAVITT.